(12) United States Patent
Tanev et al.

(10) Patent No.: US 10,512,896 B2
(45) Date of Patent: Dec. 24, 2019

(54) METHANE OXIDATION CATALYST, PROCESS TO PREPARE THE SAME AND METHOD OF USING THE SAME

(71) Applicant: SHELL OIL COMPANY, Houston, TX (US)

(72) Inventors: Peter Tanev Tanev, Houston, TX (US); Mario Soorholtz, Mannheim (DE)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/142,677

(22) Filed: Sep. 26, 2018

(65) Prior Publication Data

US 2019/0022625 A1   Jan. 24, 2019

Related U.S. Application Data

(63) Continuation of application No. 15/555,680, filed as application No. PCT/EP2016/054490 on Mar. 3, 2016, now Pat. No. 10,112,178.

(30) Foreign Application Priority Data

Mar. 5, 2015 (EP) ..................... 15157705

(51) Int. Cl.
*B01J 21/06* (2006.01)
*B01J 37/02* (2006.01)
(Continued)

(52) U.S. Cl.
CPC .......... *B01J 21/066* (2013.01); *B01D 53/944* (2013.01); *B01J 23/38* (2013.01); *B01J 23/44* (2013.01);
(Continued)

(58) Field of Classification Search
CPC ............. B01D 53/922; B01D 53/925; B01D 53/9427; B01D 2251/102; B01D 2255/10;
(Continued)

(56) References Cited

U.S. PATENT DOCUMENTS 4,809,154 A   2/1989  Newton
5,326,253 A   7/1994  Dalla Betta et al.
(Continued)

FOREIGN PATENT DOCUMENTS

EP   1790412 A1 * 5/2007 ........... B01D 53/864
JP   2003245549 A   9/2003
(Continued)

OTHER PUBLICATIONS

International Search Report and Written Opinion received for PCT Patent Application No. PCT/EP2016/054490, dated Aug. 11, 2016, 19 pages.
(Continued)

*Primary Examiner* — Timothy C Vanoy

(57) ABSTRACT

The present invention provides a method of treating an exhaust gas comprising methane and NO. The exhaust gas is contacted with a catalyst in the presence of oxygen to oxidize at least part of the methane in the gas stream to carbon dioxide and water and at least part of the NO into $NO_2$ obtaining a treated gas stream. The catalyst comprises one or more noble metals supported on non-modified zirconia, wherein the zirconia comprises tetragonal zirconia and monoclinic zirconia, and wherein the weight ratio of tetragonal zirconia to monoclinic zirconia is in the range of from 1:1 to 31:1.

6 Claims, 5 Drawing Sheets

(51) Int. Cl.
B01J 37/04 (2006.01)
B01J 37/08 (2006.01)
B01D 53/94 (2006.01)
B01J 35/00 (2006.01)
B01J 23/44 (2006.01)
B01J 35/10 (2006.01)
B01J 35/04 (2006.01)
B01J 23/38 (2006.01)
B01J 37/10 (2006.01)
F01N 3/20 (2006.01)

(52) U.S. Cl.
CPC ............ B01J 35/002 (2013.01); B01J 35/04 (2013.01); B01J 35/1014 (2013.01); B01J 37/0201 (2013.01); B01J 37/0203 (2013.01); B01J 37/0236 (2013.01); B01J 37/0242 (2013.01); B01J 37/04 (2013.01); B01J 37/08 (2013.01); B01J 37/10 (2013.01); B01D 53/9477 (2013.01); B01D 2255/1023 (2013.01); B01D 2255/20715 (2013.01); B01D 2255/9207 (2013.01); B01D 2257/7025 (2013.01); B01D 2258/018 (2013.01); F01N 3/20 (2013.01); F01N 2570/00 (2013.01); Y02C 20/20 (2013.01)

(58) Field of Classification Search
CPC .... B01D 2255/20715; B01D 2257/404; B01D 2257/7025; B01D 2258/018; B01J 21/066; B01J 23/38; F01N 3/10; F01N 3/28; F01N 2570/12; F01N 2570/14
See application file for complete search history.

(56) References Cited

U.S. PATENT DOCUMENTS

| | | | | |
|---|---|---|---|---|
| 5,405,260 A * | 4/1995 | Della Betta | ........ | B01D 53/8628 431/7 |
| 5,602,481 A | 2/1997 | Fukuyama | | |
| 5,741,467 A | 4/1998 | Williamson et al. | | |
| 6,037,307 A | 3/2000 | Campbell et al. | | |
| 6,391,276 B1 | 5/2002 | Suda et al. | | |
| 7,364,712 B2 * | 4/2008 | Ohtsuka | ............... | B01D 53/864 423/245.1 |
| 2006/0178261 A1 | 8/2006 | Larcher et al. | | |
| 2006/0280667 A1 * | 12/2006 | Oonkj | .................. | B01D 53/323 423/239.1 |
| 2011/0214412 A1 | 9/2011 | Chiffey et al. | | |
| 2013/0164201 A1 | 6/2013 | Hernandez et al. | | |
| 2014/0001407 A1 * | 1/2014 | Milanov | .................. | B01J 23/63 252/373 |
| 2016/0003529 A1 | 1/2016 | Minta et al. | | |
| 2019/0046958 A1 * | 2/2019 | Wei | .......................... | B01J 23/42 |

FOREIGN PATENT DOCUMENTS

| | | | |
|---|---|---|---|
| JP | 4356324 B2 | 11/2009 | |
| JP | 5865110 B2 | 2/2016 | |
| WO | 9824726 A1 | 6/1998 | |
| WO | 9946040 A1 | 9/1999 | |
| WO | 2005044957 A2 | 5/2005 | |
| WO | 2009057961 A2 | 5/2009 | |
| WO | 2009063092 A2 | 5/2009 | |
| WO | 2009098278 A2 | 8/2009 | |
| WO | WO 2014 001423 A1 * | 1/2014 | .............. B01J 21/04 |
| WO | 2016139283 A1 | 9/2016 | |

OTHER PUBLICATIONS

Mirkelamoglu et al., "Dual-Catalyst Aftertreatment of Lean-Burn Engine Exhaust", Catalysis Today, vol. 151, Issue No. 3-4, Jun. 19, 2010, pp. 386-394, XP027065546.

Faticanti et al., "Pd Supported on Tetragonal Zirconia: Electrosynthesis, Characterization and Catalytic Activity toward CO Oxidation and CH4 Combustion", Applied Catalysis B: Environmental, vol. 60, Issue No. 1-2, Sep. 1, 2005, pp. 73-82, XP027813751.

Cordoba et al., "No Reduction by CH4 over Pd/Co-Sulfated Zirconia Catalysts", Applied Catalysis B: Environmental, vol. 56, Issue No. 4, Apr. 8, 2005, pp. 269-277, XP027813907.

Amairia et al., "Sol Gel Derived Pd/Al2O3—ZrO2 as Catalysts for Methane Combustion: Effect of Zirconium Loading", Journal of Sol-Gel Science and Technology, vol. 54, Issue No. 1, Jan. 21, 2010, pp. 29-35, XP019792512.

Meimei, "Development of Sol-Gel Prepared Palladium-Based Sulfated Zirconia Catalysts for Nitrogen Oxides Reduction with Methane", Thesis, Jan. 1, 2009, 108 pages, XP002743153.

Tidahy et al., "Nanostructured Macro-Mesoporous Zirconia Impregnated by Noble Metal for Catalytic total oxidation of toluene", Catalysis Today, Elsevier, vol. 137, Issue No. 2-4, Sep. 30, 2008, pp. 335-339, XP023438000.

Pettersen et al., "Technical and Operational Innovation for Onshore and Floating LNG",17th International Conference and Exhibition on Liquefied Natural Gas, Apr. 16-19, 2013, 12 pages, XP055134869.

International Search Report and Written Opinion received for PCT Patent Application No. PCT/EP2017/068577, dated Oct. 13, 2017, 12 pages.

International Search Report and Written Opinion received for PCT Patent Application No. PCT/EP2017/070711, dated Nov. 6, 2017, 15 pages.

* cited by examiner

METHANE OXIDATION CATALYST, PROCESS TO PREPARE THE SAME AND METHOD OF USING THE SAME

CROSS-REFERENCE TO RELATED APPLICATIONS

This application is a continuation of U.S. patent application Ser. No. 15/555,680, filed Sep. 5, 2017, which is the National Stage of International Application No. PCT/EP2016/054490, filed Mar. 3, 2016, which claims the benefit of European Application No. 15157705.3, filed Mar. 5, 2015, each of which is incorporated herein by reference.

FIELD OF INVENTION

The instant invention relates to a methane oxidation catalyst, a process to prepare a methane oxidation catalyst, the methane oxidation catalyst prepared by this process and a method of using the methane oxidation catalysts.

BACKGROUND OF THE INVENTION

One of the most abundant and economically viable alternatives to oil-derived fuels such as gasoline, kerosene and diesel is natural gas. Because of this, engine manufacturers for transport and stationary applications are shifting their attention from the traditional oil-derived fuels to the cheaper, cleaner burning, and more environmentally friendly compressed natural gas (CNG) or liquefied natural gas (LNG) fuels. In recent years, significant investments and efforts have been made to expand the natural gas fuel supply chain/infrastructure and develop natural gas specific engine hardware in order to enable the broad deployment of natural gas as s fuel. The major component in natural gas is methane. The exhaust gas of a natural gas fueled engine may contain some residual methane, which is preferably removed before the exhaust gas is released into the atmosphere in order to meet current and future environmental emission regulations. One way of removing the residual methane in the exhaust gas is by catalytically oxidizing the methane to carbon dioxide and water. Catalysts in current day catalytic converters used to treat exhaust gas are not designed to convert methane. Due to the relatively high activation temperature required for the combustion of methane, methane will typically pass through such catalytic converters unconverted.

Catalysts for methane oxidation have been reported previously. In WO2009/057961 a catalyst containing palladium and platinum supported on alumina for treating exhaust gas from a dual fuel, i.e. diesel and LNG, fueled vehicle is disclosed. The catalysts are said to have a preferred palladium:platinum ratio of 1.0:0.1-0.3 and are deposited on an alumina support. However, the performance advantage of these palladium-platinum/alumina materials was demonstrated without the presence of $H_2O$ in the feed. It is well known that exhaust gases from natural gas fueled engines in transport and stationary applications contain very high levels of $H_2O$ usually in the range of 9-17 vol %. These significant $H_2O$ levels in exhaust gas are known to have a very significant adverse effect on the activity of palladium-platinum/alumina catalysts and the stability of these catalysts in the methane oxidation reaction. Therefore, it is expected that these prior art alumina-based catalysts will suffer from excessive activity loss and activity decline rates in a commercial application for conversion of methane in exhaust gases containing significant levels of water.

U.S. Pat. No. 5,741,467 discloses mixed palladium/alumina and palladium/ceria/lanthana alumina wash coat formulations used as methane oxidation catalysts for fuel-lean or fuel-rich methane oxidation, respectively. In addition, U.S. Pat. No. 5,741,467 discloses that rhodium may be used to substitute completely or in part for the palladium. However, these catalytic formulations exhibit very low methane oxidation activity after aging as illustrated by their high temperature requirements (higher than 500° C.) for 50 vol % methane conversion, generally referred to in the art as the $T_{50}$ ($CH_4$). The low methane oxidation activities and rapid activity declines exhibited by these catalysts suggest that these catalytic formulations would most likely not find acceptance or utility in commercial natural gas-fueled engine exhaust gas treatment applications.

U.S. Pat. No. 660,248 discloses catalysts for removing hydrocarbons from exhaust gas containing methane and excess of oxygen. The catalysts comprise palladium or palladium/platinum supported on at least one support selected from zirconia, sulfated zirconia and tungsten-zirconia. The disclosed zirconia-based catalysts show improved performance compared to the previously discussed alumina-based catalyst with respect to methane oxidation activity, however the activity of these catalysts is still too low to be attractive for commercial application.

Therefore, there is a need for methane oxidation catalysts that exhibit higher methane oxidation activity for the efficient removal of non-combusted methane from exhaust gas from natural gas-fueled engines.

SUMMARY OF THE INVENTION

It has now been found that a catalyst comprising one or more noble metals supported on zirconia may show improved methane oxidation performance, where the zirconia comprises tetragonal and monoclinic zirconia in a specific weight ratio range.

Accordingly, the present invention provides a method of treating an exhaust gas comprising methane and NO by contacting said exhaust gas with a catalyst in the presence of oxygen and oxidizing at least part of the methane in the gas stream to carbon dioxide and water and at least part of the NO into $NO_2$ obtaining a treated gas stream; wherein the catalyst comprises one or more noble metals supported on non-modified zirconia, wherein the zirconia comprises tetragonal zirconia and monoclinic zirconia, and wherein the weight ratio of tetragonal zirconia to monoclinic zirconia is in the range of from 1:1 to 31:1.

The methane oxidation catalyst of the present invention provides higher methane oxidation activity, as evidenced by its lower $T_{50}$ ($CH_4$) temperatures, as well as better long term hydrothermal stability compared to those methane oxidation catalysts known in the prior art.

DETAILED DESCRIPTION OF THE INVENTION

Figure 1:
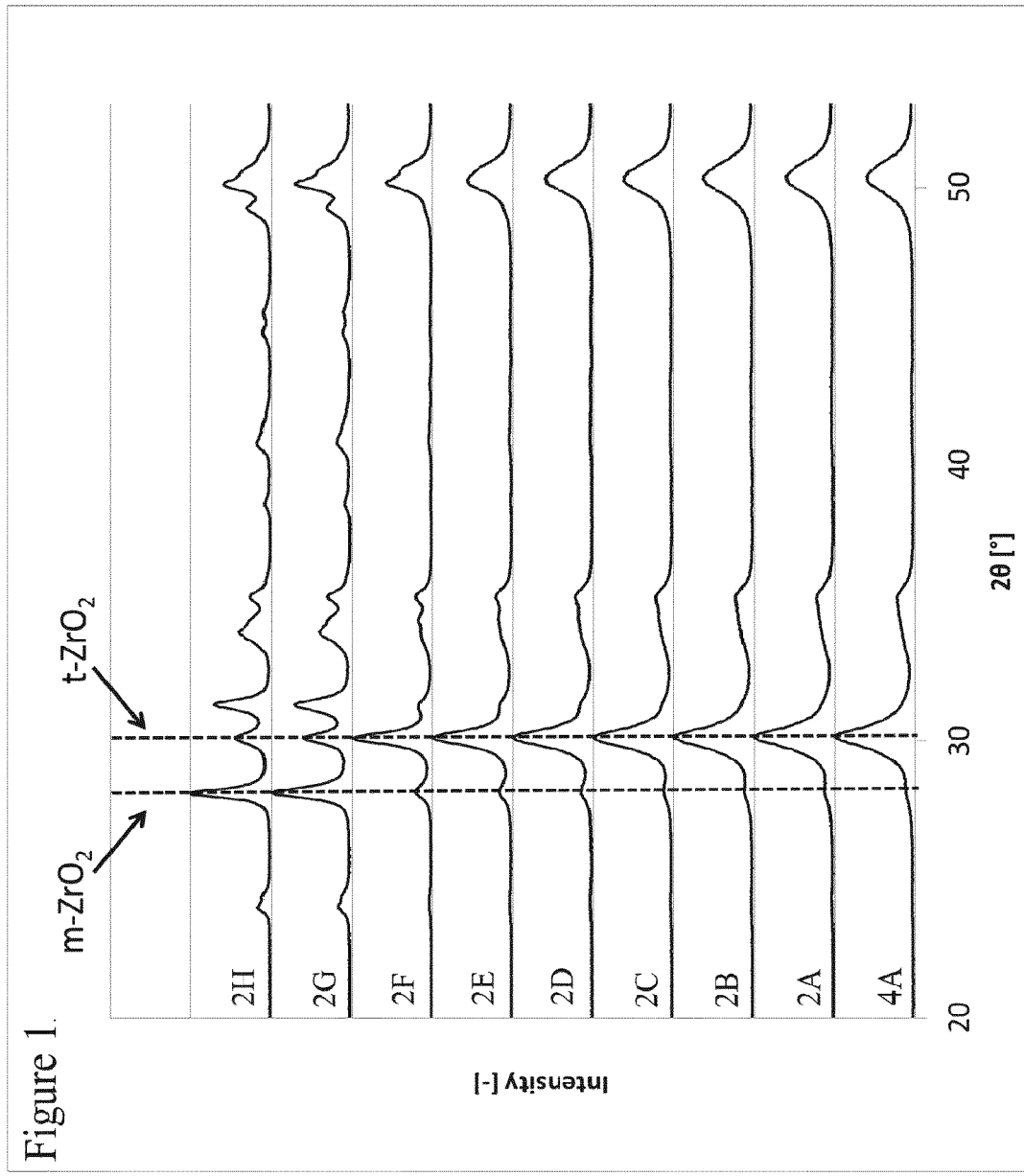
FIG. 1 shows the powder XRD patterns obtained for the catalyst Samples 2A-H and Comparative Sample 4A.

The present invention provides methane oxidation catalysts comprising one or more noble metals supported on zirconia, which zirconia comprises both tetragonal zirconia (also referred to as t-$ZrO_2$) and monoclinic zirconia (also referred to as m-$ZrO_2$).

The zirconia comprising both tetragonal zirconia and monoclinic zirconia as used in the catalyst of the present invention is not a physical mixture of tetragonal zirconia and monoclinic zirconia or equally is not a physical mixture of the crystallographic phases of tetragonal zirconia and monoclinic zirconia. Rather, the zirconia used in the catalyst of the present invention was obtained by converting, e.g. thermally converting, a precursor material into zirconia comprising both tetragonal zirconia and monoclinic zirconia resulting in a dispersion of tetragonal and monoclinic zirconia phases. Such zirconia, comprising both tetragonal zirconia and monoclinic zirconia, prepared by conversion of a precursor material is herein further also referred to as tm-$ZrO_2$. It was found that methane oxidation catalysts comprising noble metals supported on such tm-$ZrO_2$ of the present invention surprisingly exhibit significantly superior methane oxidation performance, in particular methane oxidation activity, compared to prior art methane oxidation catalysts at the same levels of metal loading. Moreover, it was found that methane oxidation catalysts comprising noble metals supported on such tm-$ZrO_2$ of the present invention also surprisingly exhibit significantly superior methane oxidation activity compared to methane oxidation catalysts comprising the same level of noble metals supported on a physical mixture of tetragonal zirconia and monoclinic zirconia, where the tetragonal zirconia and monoclinic zirconia were physically mixed in the same weight ratio.

The methane oxidation catalyst according to the present invention comprises one or more noble metals supported on zirconia. Reference herein to the term "supported on" is to noble metals that are supported on the internal and external structure surface of the zirconia, including on the wall surface of any inner pore structure of the zirconia.

As mentioned hereinabove, the zirconia of the present invention on which the noble metal is supported comprises at least two crystalline phases of zirconia, i.e. tetragonal zirconia and monoclinic zirconia. The weight ratio of tetragonal zirconia to monoclinic zirconia is in the range of from 1:1 to 31:1, preferably in the range of from 2:1 to 31:1, even more preferably 2:1 to 28:1, still more preferably 5:1 to 28:1, even still more preferably the range from 10:1 to 27.5:1 and yet even more preferably in the range of from 15:1 to 25:1, yet still even more preferably, 15:1 to 23:1. It has been found that catalysts comprising noble metals supported on a tm-$ZrO_2$ with the above weight ratio range of tetragonal zirconia to monoclinic zirconia result in an improved methane oxidation activity, i.e. in a lower $T_{50}$ ($CH_4$) value, compared to other prior art zirconia- or alumina-comprising catalysts for methane oxidation with the same noble metal loading. The temperature at which at least 50 vol % of the methane is oxidized is referred to herein as $T_{50}$ ($CH_4$). The $T_{50}$ ($CH_4$) value is a measure for the methane oxidation activity of a catalyst. A lower $T_{50}$ ($CH_4$) value indicates a higher methane oxidation activity of the catalyst. When measured under essentially identical test conditions, the $T_{50}$ ($CH_4$) values can be used to compare the methane oxidation activity of two or more catalysts. It was also found that providing a weight ratio of tetragonal zirconia to monoclinic zirconia in the methane oxidation catalyst according to the present invention may result in improved methane oxidation activity stability over prolonged periods of use under hydrothermal conditions.

Herein, the weight ratio of the tetragonal zirconia to monoclinic zirconia is the weight ratio as determined by a quantitative XRD phase analysis using commercially available software. The so determined weight ratio of tetragonal zirconia to monoclinic zirconia in the range from 1:1 to 31:1 corresponds to an XRD signal intensity ratio of signal intensity at 2θ=30.1° (characteristic for tetragonal zirconia) to the signal intensity at 2θ=28.1° (characteristic for monoclinic zirconia) in the range of from 0.8:1 to 12.5:1. A more detailed description of the quantitative XRD phase analysis as used in this invention is provided herein below.

For the purpose of determining the weight ratio of the tetragonal zirconia to monoclinic zirconia, any other zirconia, e.g. a zirconia binder material that is added to the catalyst by physical mixing is not taken into consideration.

As mentioned herein above, the zirconia on which the noble metal(s) are supported comprises tetragonal and monoclinic zirconia. Preferably, the monoclinic zirconia is present as a dispersion of monoclinic zirconia in the tetragonal zirconia or even as a dispersion of monoclinic zirconia in a (semi-)continuous tetragonal zirconia matrix. Such a structure could for instance be prepared by the thermal conversion of a single zirconia precursor according to a process for preparing a methane oxidation catalyst according to the present invention. Without wishing to be bound to any particular theory, it is believed that such a distribution of tetragonal and monoclinic crystalline zirconia phases cannot be attained by physically mixing tetragonal zirconia with monoclinic zirconia. Furthermore, without wishing to be bound to any particular theory, it is believed that by preparing the zirconia of the catalyst of the present invention, i.e. the tm-$ZrO_2$, from a single zirconia precursor, the resulting distribution of tetragonal zirconia and monoclinic zirconia in the tm-$ZrO_2$ allows for the creation of a high noble metal dispersion on the resulting catalyst. Furthermore, this may provide a catalyst having an advantageously high noble metal surface area and/or noble metal oxide surface area. The obtained distribution of tetragonal zirconia and monoclinic zirconia in the tm-$ZrO_2$ is believed to restrict the diffusion, migration and/or agglomeration of the noble metal during preparation as well as during use, including the use under typical hydrothermal methane oxidation operating conditions. This benefits the methane oxidation activity and improves the stability of the methane oxidation activity of the catalyst of this invention, including under hydrothermal conditions, such as the conditions typically encountered in treating exhaust gas from natural gas fueled engines.

As explained herein below in more detail, the zirconia precursor may be any zirconium-comprising compound that converts into zirconia upon exposure to elevated temperatures. The zirconia precursor may also comprise, consist or essentially consist of tetragonal zirconia. Without wishing to be bound to any particular theory, it is believed that upon exposing the zirconia precursor to elevated temperatures first tetragonal zirconia is formed, which tetragonal zirconia may subsequently under exposure to a, typically higher, elevated temperature be partially converted to monoclinic zirconia. By preparing the zirconia of the present invention by one or more thermal treatment steps from a single zirconia precursor, a dispersion of monoclinic zirconia in tetragonal zirconia may be obtained. As mentioned herein above, preferably, the zirconia on which the noble metal is supported comprises tetragonal zirconia that forms a (semi-) continuous matrix structure, with embedded monoclinic zirconia in the matrix structure. Suitable zirconia precursors are provided herein below.

The zirconia on which the noble metal is supported may preferably comprise a specific surface area in the range of from 10 to 200 $m^2/g$.

The methane oxidation catalyst according to the invention comprises one or more noble metals. Any combination of two or more noble metals may be used. Preferably, the methane oxidation catalyst comprises one or more noble metals selected from the group consisting of palladium, platinum, ruthenium, rhodium, osmium and iridium. Preferably, the methane oxidation catalyst comprises one or more noble metals selected from the group consisting of palladium, platinum and rhodium. Preferred combinations of noble metals comprise: (1) palladium and platinum, (2) palladium and rhodium, and (3) palladium, platinum and rhodium. Such combinations of noble metals may provide a methane oxidation catalyst with higher methane oxidation activity, i.e. a lower $T_{50}$ ($CH_4$) value and a more stable methane oxidation activity.

The methane oxidation catalyst may comprise in the range of from 0.5 to 15 wt % of noble metal, based on the total combined weight of noble metal(s) and the total weight of the tm-$ZrO_2$. Preferably, the methane oxidation catalyst comprises at least 1 wt % of noble metal, based on the total combined weight of noble metal(s) and the total weight of the tm-$ZrO_2$.

Typically, the catalytically active form, i.e. for catalyzing the oxidation of methane, of the noble metal is its noble metal oxide form. This is for instance true for palladium. However, in some cases, for example, where both palladium and platinum are present on the catalyst, a portion of the noble metal will remain in its metallic form. Therefore, preferably, at least part of noble metal(s) is present in the methane oxidation catalyst in the form of noble metal oxides.

The methane oxidation catalyst may have any suitable shape or form including powders, particles, coatings, washcoats, films, extrudates, rings, pellets, tablets or ceramic monoliths of various shapes and sizes. Preferably, the methane oxidation catalyst is provided as a particle with an average particle size in the range of from 0.1 to 500 μm, preferably of from 0.5 to 500 μm. The particles may e.g. be in the form of powders or in a washcoat. The methane oxidation catalyst may comprise zirconia particles that have been shaped to form the above mentioned larger catalyst structures. The methane oxidation catalyst may for instance be shaped in a process including extrusion and spray drying.

The methane oxidation catalyst may optionally contain a binder material.

The methane oxidation catalyst may be deposited on a monolith substrate in the form of a coating, washcoat or film. Reference herein to a washcoat is to a dispersion of a material, in this case the methane oxidation catalyst particles, over the surface area of the substrate, whereby the washcoated material forms a thin layer on the surface of the substrate. Suitable substrates include ceramic and metallic monoliths. Such ceramic and metallic monoliths are substrates with nearly uniform, well-defined pore or channel structures. The ceramic and metallic monoliths may be characterized by the number of pore channels per square inch; this unit is also referred to in the art as cells per square inch or CPSI. Preferably, the ceramic or metallic monolith substrate comprises in the range of from 50 to 10,000 pore channels per square inch (323 to 64500 pore channels per $cm^2$), more preferably, 150 to 1000 pore channels per square inch (968 to 6450 pore channels per $cm^2$).

In one preferred embodiment, the methane oxidation catalyst of the invention is provided on a ceramic or metallic monolith substrate comprising pore channels, defining an inner pore channel surface, wherein the methane oxidation catalyst is present in the form of a coating, washcoat or a film of a thickness in the range of from 10 to 250 μm on the monolith inner pore channel surface. Preferably, in the range of from 50 to 400 kg, more preferably of from 75 to 300 kg, of methane oxidation catalyst per cubic meter of monolith substrate is supported on the monolith substrate. Preferably, the resulting noble metal content on the monolith is in the range of from 1 to 16 $kg/m^3$ of monolith substrate, more preferably in the range of from 1 to 8 $kg/m^3$ of monolith substrate.

It is a particular advantage of the methane oxidation catalyst according to the invention that it provides higher methane oxidation activity or lower $T_{50}$ ($CH_4$) values as well as better long term hydrothermal stability compared to those methane oxidation catalysts known in the prior art.

It is a further particular advantage of the methane oxidation catalyst according to the invention that it may also show activity toward the conversion of NO to $NO_2$. This may be of particular value when the methane oxidation catalyst is to be used in an application wherein next to methane, there is a desire to convert NO (and optionally $NO_2$) to environmentally benign $N_2$ by using a combination of methane oxidation catalyst to convert the NO to $NO_2$ and then a commercially available SCR (selective catalytic reduction) catalyst to reduce NO and/or $NO_2$ to $N_2$. This may, for instance, be the case where the exhaust gas to be treated comprises methane and NO. An example of such a gas stream would be an exhaust gas from a natural gas fueled engine. The methane oxidation catalysts may therefore in a particular embodiment of the invention, be provided in combination with a SCR catalyst, e.g. a SCR catalyst comprising titanium(IV)oxide ($TiO_2$), tungsten(VI)oxide ($WO_3$), vanadium(V)oxide ($V_2O_5$), molybdenum(VI) oxide, noble metals, transition metal-exchanged zeolite or a zeolite. The methane oxidation catalyst only needs to convert part of the NO to $NO_2$ as most SCR catalysts show a more optimal conversion to $N_2$ where a mixture of NO and $NO_2$ is provided to the SCR catalyst.

As mentioned herein before, the catalyst of the present invention shows improved methane oxidation activity, which is evidenced by the lower $T_{50}$ ($CH_4$) values obtained when oxidizing methane, in particular methane present in diluted methane comprising gas streams. In particular, in the case of the oxidation of methane in a gas stream consisting of less than 5000 ppmv of methane and balance of nitrogen, based on the volume of the total gas stream, the $T_{50}$ ($CH_4$) of the methane oxidation catalyst may be equal to or less than 405° C. for the catalyst according to the invention. In the particular case, where the weight ratio of tetragonal to monoclinic zirconia in the t/m-$ZrO_2$ is in the range of from 5:1 to 28:1, the $T_{50}$ ($CH_4$) value of the methane oxidation catalyst may be equal to or less than 400° C. Furthermore, in the particular case, where the weight ratio of tetragonal to monoclinic zirconia in the t/m-$ZrO_2$ is in the range of from 15:1 to 25:1 the $T_{50}$ ($CH_4$) value of the methane oxidation catalyst may be equal to or less than 395° C. More in particular, in the case of the oxidation of methane in a gas stream having a composition consisting of 2000 ppmv $CH_4$, 1000 ppmv CO, 150 ppmv NO, 7.5 vol % $CO_2$, 6 vol % $O_2$, 15 vol % $H_2O$, and balance of $N_2$, based on the volume of the total gas stream, the $T_{50}$ ($CH_4$) value of the methane oxidation catalyst may be equal to or less than 405° C. for the catalyst according to the invention. In the particular case, where the weight ratio of tetragonal to monoclinic zirconia in the t/m-$ZrO_2$ is in the range of from 5:1 to 28:1 the $T_{50}$ ($CH_4$) value of the methane oxidation catalyst may be equal to or less than 400° C. Furthermore, in the particular case where the weight ratio of tetragonal to monoclinic zirconia in the t/m-$ZrO_2$ is in the range of from 15:1 to 25:1 the $T_{50}$ ($CH_4$) value of the methane oxidation catalyst may be equal to or less than 395° C.

In another aspect the invention provides a process for preparing a methane oxidation catalyst. The process for preparing a methane oxidation catalyst comprises the following steps:

a.) calcining a zirconia precursor at a temperature of in the range of from 675 to 1050° C. to prepare zirconia comprising tetragonal zirconia and monoclinic zirconia, wherein the weight ratio of tetragonal zirconia to monoclinic zirconia is in the range of from 1:1 to 31:1;

b.) impregnating the obtained zirconia with a noble metal precursor-comprising impregnation solution;

c.) drying the wet noble metal-impregnated zirconia at a temperature of no more than 120° C.; and d.) calcining the dried noble metal-impregnated zirconia at a temperature of in the range of from 400 to 650° C.

In step (a) a zirconia precursor may be provided and calcined. Preferably, a single zirconia precursor is provided. Any zirconia precursor that can be thermally converted into a dispersion of tetragonal and monoclinic zirconia may be used.

In one embodiment, the zirconia precursor is tetragonal zirconia. During the calcination in step (a) at least part of the tetragonal zirconia will be converted to monoclinic zirconia.

Alternatively, the zirconia precursor may be amorphous zirconia or a zirconium-comprising precursor, including zirconium hydroxide. Without wishing to be bound to any particular theory, it is believed that in case of an amorphous zirconia or zirconium-comprising precursor, the amorphous zirconia or zirconium-comprising precursor, during the calcination of step (a), is initially converted to tetragonal zirconia, and subsequently part of the tetragonal zirconia is converted to monoclinic zirconia.

Therefore, the zirconia precursors for the preparation of the tm-$ZrO_2$ of this invention include, but are not limited to, tetragonal zirconia, amorphous zirconia and zirconium-comprising precursors, wherein suitable zirconium-comprising precursors include, but are not limited to zirconium hydroxides and zirconium hydroxide sols, zirconium hydroxide gels, $ZrOCl_2$, $ZrCl_4$, $ZrO(NO_3)_2$, $Zr(NO_3)_4$, zirconium lactate, zirconium alkoxides, zirconium acetate, $Zr(CH_2CHCO_2)_4$, Zirconium(IV) carbonate, $Zr(HPO_4)_2$, and $Zr(SO_4)_2$.

The zirconia precursor may contain impurities and other elements that are naturally present in the precursor compounds or are unintentionally introduced during the zirconia manufacturing process. The group of possible impurities and elements includes, but is not limited to the group consisting of hafnium and silicon compounds, for example, hafnia and silica.

The zirconia of the invention is a non-modified zirconia. Non-modified zirconia is defined as a zirconia or a zirconium-comprising compound that has not been modified or doped with another element or compound during the methane oxidation catalyst manufacturing process. Non-modified zirconia of this invention does not include sulfated zirconia or tungsten modified zirconia. As shown in the Examples, modified zirconia (i.e., sulfated or tungsten-modified zirconia) perform poorly in methane oxidation relative to the non-modified zirconia comprising methane oxidation catalyst of this invention. The presence of impurities and other elements that are naturally present in the zirconia precursor compounds, such as hafnium, or are unintentionally or intentionally introduced during the zirconia manufacturing process, such as silicon or silica, as described above, does not make the zirconia a modified zirconia.

During step (a), the zirconia precursor is calcined at a temperature in the range of from 675 to 1050° C. Although, depending on the nature of the precursor used, tetragonal zirconia may be present or will form at calcination temperatures above 500° C., significant conversion, e.g. of tetragonal zirconia, to monoclinic zirconia only occurs at temperatures of 675° C. and higher. On the other hand, predominantly to almost pure monoclinic zirconia is obtained upon calcination at very high temperatures of 1100° C. and above. Preferably, the zirconia precursor is calcined at a temperature of in the range of from 750 to 1050° C., as the tm-$ZrO_2$ obtained by calcination of zirconia precursor at temperatures in this range were found to result in methane oxidation catalysts having a weight ratio of tetragonal to monoclinic zirconia according to the present invention. The catalysts thus obtained were found to have an improved methane oxidation activity. Even more preferably, the zirconia precursor is calcined at a temperature in the range of from 800 to 1025° C. as the tm-$ZrO_2$ obtained by calcination of zirconia precursor at temperatures in the range of from 800 to 1025° C. were found to result in methane oxidation catalysts with an even further improved methane oxidation activity.

Although, it is possible to flash calcine the zirconia precursor, sometimes in a matter of seconds, it is preferred to calcine the zirconia precursor for at least 30 minutes. The resulting zirconia in the methane oxidation catalyst of this invention comprises tetragonal zirconia and monoclinic zirconia wherein the weight ratio of tetragonal zirconia to monoclinic zirconia is in the range of from 1:1 to 31:1, preferably in the range of from 2:1 to 31:1, even more preferably 2:1 to 28:1, still more preferably 5:1 to 28:1, even still more preferably the range from 10:1 to 27.5:1 and yet even more preferably in the range of from 15:1 to 25:1, yet still even more preferably, 15:1 to 23:1. Calcination processes are well known in the art and the selection of the most suitable calcination temperature and calcination time will depend on the choice of the zirconia precursor. Such a selection of calcination conditions is within the skills of the person skilled in the art.

Where the weight ratio of tetragonal to monoclinic zirconia is within the range provided by the present invention, the exact choice of zirconia precursor and calcination procedure and temperature, which were used to come to such a weight ratio are of less significance.

The step of calcining the zirconia precursor is preferably performed in an oxygen-comprising atmosphere, preferably air.

In step (b) of the process, the zirconia obtained in step (a) is impregnated with a noble metal precursor-comprising impregnation solution. Preferably, the impregnation solution is an aqueous noble metal precursor-comprising impregnation solution. The noble metal precursor-comprising impregnation solution may comprise one or more noble metal precursors, preferably one or more noble metals selected from the group consisting of palladium, platinum, ruthenium, rhodium, osmium and iridium. More preferably, the noble metal precursor-comprising impregnation solution comprises one or more noble metals selected from the group consisting of palladium, platinum and rhodium. Alternatively, the impregnation of step (b) comprises two or more sequential impregnation steps with the same or different noble metal precursor-comprising impregnation solutions. Using different impregnation solutions may allow for an alternative way to achieve the impregnation of the zirconia with different noble metals. Any noble metal precursor that is soluble in the impregnation solution may be used. Suitable palladium, platinum and rhodium noble metal precursors include, but are not limited to, $Pd(NO_3)_2$, $Pd(NH_3)_4(CH_3CO_2)_2$, $Pd(NH_3)_4Cl_2$, $PdCl_2$, $Pd(CH_3CO_2)_2$, $Pd(NH_3)_4(HCO_3)_2$, Palladium(II) acetylacetonate, Palladium(II) citrate, Palladium(II) oxalate, $K_2PdCl_4$, $K_2PdCl_6$, $Pd(NH_3)_2Cl_4$, PdO, $Pd(NH_3)_2Cl_4$, $Pt(NH_3)_2Cl_4$, $H_2Pt(OH)_6$, $PtBr_2$, $PtCl_2$, $PtCl_4$, $(NH_4)_2PtCl_6$, $Pt(NH_3)_2Cl_2$, $Pt(CN)_2$, $Pt(NO_3)_2$, $Pt(NO_3)_4$, $PtO_2$, Platinum(II) acetylacetonate, Platinum(II) acetate, $Na_2PtCl_6$, $K_2PtCl_6$, $H_2PtCl_6$, $K_2PtCl_4$, Platinum(II) citrate, Platinum(II) oxalate, $RhCl_3$, $Rh_4(CO)_{12}$, $Rh_2O_3$, $RhBr_3$, Rhodium(II) acetylacetonate, Rhodium (II) citrate, Rhodium (II) oxalate and $Rh(NO_3)_3$.

It may be advantageous for the impregnating solution to comprise at least one or more noble metal complexing or chelating compounds in a molar ratio of a complexing or chelating compound to noble metal of from 1:1 to 5:1. Suitable complexing or chelating compounds include, but are not limited to citric acid, sorbitol, oxalic acid, tartaric acid, maleic acid, ethylenediaminetetraacetic acid, acetic acid, crown ethers, bipyridine, bipyrimidine, acetylacetone, ethyldiamine, phenanthroline, trisodium citrate, ammonium citrate, lactic acid, pantoic acid, hydroxypyruvic acid, mannitol, glucose, fructose, hydroxybutyric acid, and methyl cellulose. It was found that the addition of such noble metal complexing or chelating compounds, and in particular citric acid, to a palladium precursor-comprising impregnation solution may lead to higher catalyst activity for methane oxidation.

Following the impregnation, the wet noble metal-impregnated zirconia is dried in step (c) at a temperature of no more than 120° C. Preferably, the wet noble metal-impregnated zirconia is dried in step (c) for a period of at least 1 hour. The dried noble metal-impregnated zirconia is subsequently calcined in step (d) at a temperature in the range of from 400 to 650° C., preferably of from 450 to 600° C. Preferably, the dried impregnated zirconia is calcined in step (d) for a period of at least 1 hour. The step of calcining the noble metal-impregnated zirconia is preferably performed in an oxygen-comprising atmosphere, preferably air. During the calcining in step (d) at least part of the noble metal will be converted to noble metal oxides.

It may be advantageous, prior to drying and subsequently calcining the still wet noble metal-impregnated zirconia in steps (c) and (d), to allow the wet noble metal-impregnated zirconia to age for a period of at least 1 hour, preferably for a period of from 1 to 5 hours. It has been found that such an aging step may result in methane oxidation catalyst having a higher catalyst activity for methane oxidation.

Preferably, a sufficient amount of noble metals is provided during the impregnation to provide a methane oxidation catalyst comprising in the range of from 0.5 to 15 wt % of noble metal, based on the total combined weight of noble metal(s) and the total weight of the $tm-ZrO_2$. Preferably, thus obtained methane oxidation catalyst comprises at least 1 wt % of noble metal, based on the total combined weight of noble metal(s) and the total weight of the $tm-ZrO_2$.

The methane oxidation catalyst may be prepared in the form of particles, in particular particles with a size in the range of from 0.1 to 500 μm. Depending on the type of zirconia precursor used, the zirconia precursor may be shaped into particles of a desired particle size prior to step (a) or alternatively the zirconia obtained from step (a) may be shaped into particles of a desired particle size. Suitable methods for preparing the zirconia or zirconia precursor particles of a desired particle size include, but are not limited to: wet milling, wet grinding, dry grinding, mulling, thermal treatment, precipitation or spray drying. Such zirconia particles have a high surface area, allowing for an improved distribution of the noble metal on the zirconia, which is beneficial for the methane oxidation activity of the final catalyst. It has been found that some methods to reduce the particle size of the zirconia or zirconia precursor particles may cause a change to the crystallographic zirconia phase composition, i.e., change in the weight ratio of tetragonal to monoclinic zirconia in the zirconia. In particular, it has been observed that when using methods such as wet milling, wet grinding or dry grinding, the tetragonal zirconia that was present after the previous calcination at elevated temperatures could partially be transformed to monoclinic zirconia. In this case, the weight ratio of tetragonal to monoclinic zirconia in the $tm-ZrO_2$ could be slightly reduced. Without wishing to be bound to any particular theory it is believed that this further formation of monoclinic zirconia is caused by the occurrence of localized increases in the temperature caused by the friction between the particles and/or, in general, by the energy impact of the milling process on the crystalline tetragonal zirconia structure. This increased temperature may locally result in a small additional thermal conversion of tetragonal to monoclinic zirconia.

The methane oxidation catalyst according to the present invention may be prepared in any suitable form or size, including but not limited to the above mentioned particles, powders, extrudates, rings, pellets, tablets, or monoliths. The methane oxidation catalyst may be deposited on a substrate in the form of a layer, film or coating. In one preferred embodiment, the process for preparing the methane oxidation catalyst according to the invention comprises depositing the noble metal-impregnated zirconia after calcination in step (d) in the form of a layer, film or coating on a ceramic or metallic monolith substrate. In an equally preferred embodiment, the process for preparing the methane oxidation catalyst according to the invention comprises depositing the zirconia obtained in step (a) in the form of a layer, film or coating on a ceramic or metallic monolith substrate and subsequently impregnating and treating the zirconia deposited on the monolith substrate according to steps (b) to (d). Suitable ceramic or metallic monoliths have been described herein above. The zirconia or impregnated zirconia are preferably deposited by contacting the monolith with a suspension of zirconia, that is preferably aqueous or impregnated zirconia particles, in particular particles with a size in the range of from 0.1 to 500 μm. Preferably, the noble metal-impregnated zirconia obtained in step (d) or the zirconia obtained in step (a) is deposited on the ceramic or metallic monolith by a washcoating step. Typically, the noble metal-impregnated zirconia obtained in step (d) or the zirconia obtained in step (a) are provided in the form of a suspension to the washcoating step. In the washcoating step the zirconia or noble metal-impregnated zirconia particles are suspended in the washcoat suspension prior to application to the monolith substrate. Washcoating the substrate results in depositing of a thin layer of zirconia particles or noble metal-impregnated zirconia particles on the surface of the pore channels of the monolith substrate, which in turn maximizes the catalytically active surface of the catalyst available for the oxidation of methane. Where the noble metal-impregnated zirconia obtained in step (d) or the zirconia obtained in step (a) is deposited on the ceramic or metallic monolith substrate by a washcoating step, the preferred particle size of the noble metal-impregnated zirconia or the zirconia particles in the washcoat is in the range of from 0.1 to 50 µm. preferably of from 0.1 to 20 µm as determined by light scattering. If the particle size of the zirconia is too large, the washcoat suspension may be subjected to wet milling in order to reduce the particle size of the zirconia or impregnated zirconia particles to sizes in the above mentioned range.

In one embodiment, the process for preparing a methane oxidation catalyst comprises following step (a), but before step (b):
(i) preparing an aqueous suspension of the zirconia containing in the range of from 10 to 65 wt % of zirconia based on the weight of the total suspension;
(ii) adding an acid to the aqueous suspension of zirconia particles to adjust the pH of the suspension to a pH of in the in the range of from 3 to 6, preferably of from 3.5 to 4.5;
(iii) wet milling the aqueous suspension of zirconia particles until the suspension comprises zirconia particles of an average particle size by volume of at most 20 µm as determined by light scattering and optionally readjusting pH of the milled suspension with an acid to maintain it in the range of from 3 to 6, preferably from 3.5 to 4.5;
(iv) washcoating a layer of the suspension obtained in step (iii) on the surface of a ceramic or metallic monolith substrate; and
(v) drying the washcoated ceramic or metallic monolith substrate at a temperature of no more than 120° C. for a period of at least 1 hour.

In the subsequent step (b), the washcoated ceramic or metallic monolith substrate, and in particular the zirconia in the washcoat, is impregnated with the noble metal precursor-comprising impregnation solution after which it is dried and calcined according to step (c) and (d) to produce the finished methane oxidation catalyst. Optionally, the washcoated ceramic or metallic monolith substrate of step (v) is calcined at a temperature in the range of from 400 to 650° C., preferably of from 450 to 600° C., for a period of at least 1 hour prior to impregnation with the noble metal impregnation solution.

In an alternative embodiment, steps (i) to (v) are performed after step (d) using the noble metal-impregnated zirconia to prepare the aqueous suspension in step (i). In such a case step (v) is followed by a calcination of the dried washcoated ceramic or metallic monolith substrate at a temperature in the range of from 450 to 650° C., preferably of from 450 to 600° C., for a period of at least 1 hour to produce the finished methane oxidation catalyst.

The washcoating step may be performed using any suitable washcoating procedure, including but not limited to (1) dipping the monolith substrate into the suspension, (2) pouring the suspension over the monolith substrate or (3) forcing the suspension through the pore channels of the monolith substrate.

Optionally, in the range of from 5 to 20 wt %, based on the weight of the zirconia, of a binder material may be added to the zirconia particle suspension prior to step (iii). In addition, optionally, in the range of from 1 to 20 wt %, based on the weight of the zirconia in the suspension prepared in step (i), of a viscosity modifying compound may be added to the zirconia particle suspension prior to step (iii). Suitable viscosity modifying compounds include, but are not limited to acetic acid, citric acid, methyl cellulose, chitin, starch, glucose and fructose.

Alumina or zirconia may be used as a binder, but the amount of alumina or zirconia introduced as a binder in the catalyst should be limited to less than 20 wt %, based on the weight of the methane oxidation catalyst. If used, the amount of alumina or zirconia should be in the range of from 1 wt % to 20 wt %, preferably in the range of from 2 wt % to 10 wt %.

Preferably, in the range of from 50 to 400 kg, more preferably of from 75 to 300 kg, of zirconia, excluding any zirconia added as binder, is washcoated on the monolith substrate per $m^3$ of monolith substrate. Preferably, during the impregnation with the noble metal comprising impregnation solution, an amount of noble metal precursor is absorbed or adsorbed or deposited on the zirconia to obtain a final catalyst comprising in the range of from 1 to 16 kg of noble metal per $m^3$ of monolith substrate, more preferably in the range of from 1 to 8 kg of noble metal per $m^3$ of monolith substrate.

In another aspect, the invention provides a methane oxidation catalyst prepared by a process for preparing a methane oxidation catalyst according to the present invention.

In a further aspect, the invention provides a method of oxidizing methane. This method comprises contacting a gas stream comprising methane with a methane oxidation catalyst according to the present invention, as described herein, in the presence of oxygen and oxidizing at least part of the methane in the gas stream to carbon dioxide and water. In a certain instance, the gas stream comprising methane is an exhaust gas from a natural gas-fueled engine. The natural gas-fueled engine may be fueled by a fuel comprising atmospheric pressure natural gas, compressed natural gas, liquefied natural gas, or a combination thereof. In a particular aspect, the natural gas-fueled engine is fueled by compressed natural gas or liquefied natural gas. The natural gas fuel could be spark ignited or diesel ignited. Alternatively, the natural gas-fueled engine is fueled by a mixture of natural gas and one or more other hydrocarbon fuels, including, but not limited to gasoline, kerosene, diesel or gasoil, in particular a mixture of compressed natural gas or liquefied natural gas with diesel or gasoil. In another alternative, the natural gas-fueled engine may be fueled by either natural gas or by a hydrocarbon fuel.

Any natural gas-fueled engine is contemplated. Exemplary natural gas-fueled engines include heavy duty transport engines, such as those used in the trucking, mining, marine, and rail industries. Additional exemplary natural gas-fueled engines include stationary service engines, such as natural gas compressors, gas turbines, and power plant service engines. Natural gas-fueled engines may operate alternatively in either fuel-lean or fuel-rich burn modes. Fuel-lean burn mode refers to engine operation in which fuel is burned with an excess of air, i.e. oxygen. For example, in fuel-lean burn mode, oxygen molecules and methane molecules may be provided to the natural gas-fueled engine in a molar ratio of oxygen to methane molecules (also referred to as $O_2:CH_4$ ratio) up to 100:1. Fuel-rich burn mode, as used herein, means maintaining an, approximately, stoichiometric ratio of oxygen molecules to hydrocarbon molecules, i.e. an $O_2:CH_4$ ratio of 2. Preferably, the natural gas-fueled engine is operated in a fuel lean burn mode. By operating the natural gas-fueled engine in a fuel lean mode, at least part, and preferably all, of the oxygen required to oxidize the methane in the exhaust gas is provided as part of the exhaust gas.

The method to oxidize methane according to the present invention may be used with an exhaust gas which contains a methane concentration of less than or equal to 10000 ppm by volume (ppmv), preferably in the range of from 25 ppmv to 10000 ppmv, more preferably of from 50 to 5000 ppmv and even more preferably from 100 to 3000 ppm.

Preferably, the methane and oxygen are contacted with the methane oxidation catalyst in a $O_2:CH_4$ ratio at least 2:1, more preferably at least 10:1, even more preferably at least 30:1, still even more preferably at least 50:1, yet more preferably at least 100:1. Preferably, the methane and oxygen are contacted with the methane oxidation catalyst in a $O_2:CH_4$ ratio of in the range of from 2:1 to 200:1, more preferably of from 10:1 to 200:1, even more preferably of from 30:1 to 200:1, still even more preferably of from 50:1 to 200:1, yet more preferably if from 100:1 to 200:1.

Preferably, the methane and oxygen are contacted with the methane oxidation catalyst at a temperature in the range of from 120 to 650° C., more preferably of from 250 to 650° C., still more preferably 300 to 600° C.

The oxygen used to oxidize the methane may be provided as part of the gas stream comprising methane, for instance the exhaust gas, and/or from an external source, such as air, oxygen enriched air, pure oxygen or mixtures of oxygen with one or more other, preferably inert, gases. Optionally, where part or all of the oxygen is provided from a source other than an exhaust gas it may be advantageous to preheat the oxygen prior to contacting the oxygen with the methane.

The gas stream comprising methane may further comprise in the range of from 0 to 20 vol % water, preferably of from 8 to 15 vol %.

The gas stream which comprises methane may further comprise from 0 to 50 ppm by volume of $SO_2$, preferably of from 0 to 30 ppm by volume of $SO_2$. Sulphur is known to for its ability to deactivate noble metal catalysts. To reduce sulphur-based deactivation of the catalyst, the method according to the invention may therefore include contacting the gas stream comprising methane with a $SO_2$ absorbent, prior to contacting the methane oxidation catalyst, to remove at least part of the $SO_2$ from the gas stream comprising methane.

In a particular application, the step of contacting a stream which comprises methane with the methane oxidation catalyst occurs at a stream gas hourly space velocity (GHSV) in the range of from 10,000 to 120,000 hr$^{-1}$, preferably of from 20,000 to 100,000 hr$^{-1}$.

In a specific application, the method of oxidizing methane results in at least 50 vol % of the methane in the stream being oxidized at a temperature of equal to or less than 450° C., preferably 405° C., more preferably 400° C., still more preferably 395° C., even still more preferably 390° C.

EXAMPLES

The following examples illustrate the present invention but are not intended to limit the scope of the invention.

The following test procedures were used:
Test Procedures
Catalyst Performance Evaluation Test The catalyst methane oxidation activity measurements were carried out in a fully automated parallelized catalyst testing rig with 48 fixed bed reactors (each reactor with a total volume of 1 mL) made from stainless steel. The catalysts were tested using simulated exhaust gas compositions and operating conditions similar to those of natural gas fueled engines operated with an oxygen surplus (fuel-lean). The conditions used for the testing are shown in Table 1.

TABLE 1

| Catalyst testing conditions | |
|---|---|
| Temperature range | 375-550° C. |
| Pressure | Ambient |
| Exhaust gas composition | 2000 ppmv $CH_4$, 1000 ppmv CO, 150 ppmv NO, 7.5 vol % $CO_2$, 6 vol % $O_2$, 15 vol % $H_2O$, balance $N_2$ |
| GHSV | 50000 hr$^{-1}$ |
| Mass of catalyst | 0.2 g |
| Catalyst particle size fraction | 315-500 μm |

A sieved fraction of the catalysts with particle sizes from 315-500 μm was used for the catalytic performance testing. For the reactor loading, the desired catalyst mass was diluted with an inert material (corundum) of the same particle size fraction to a total reactor volume of 1 mL. This was done in order to mimic a methane oxidation catalyst provided on a monolith substrate with a deposition of 200 g of a methane oxidation catalyst washcoat per liter of catalyst volume (including the monolith substrate).

The $T_{50}$ ($CH_4$) values (temperature requirement for 50 vol % $CH_4$ conversion after >100 h time-on-stream) were used as criteria for the evaluation of methane oxidation activity. The comparison of methane oxidation activity was done at equal noble metal loading levels (4 wt %) for all catalysts. The CO conversion during these tests was determined to be 100% for all tested catalytic materials in the temperature range described in Table 1.

Quantitative Analysis of Crystalline Tetragonal and Monoclinic $ZrO_2$ Phases Composition The powder XRD crystallographic phases analysis of zirconia based catalytic materials was carried out on a Bruker D8 Advance X-ray diffraction system (Diffrac.EVA software, Bragg-Brentano geometry; high resolution LYNX-EYE XE detector; Cu Kα radiation ($\lambda$=1.5406 Å) in the 2θ range from 5° to 140°; 1° steps; scan rate 0.02°/sec; goniometer radius 28 cm; Ni filter; applied power 40 kV/40 mA).

The quantitative phase analysis was carried out for diffraction patterns of Samples 2A-H and Comparative Sample 4A using the TOPAS software package (Version 4.2) available from Bruker company. Reference materials were used for peak identification [tetragonal zirconia (00-050-1089)/monoclinic zirconia (00-037-1484)/palladium oxide (00-041-1107)]. These reference materials data are available in the TOPAS software package. Quantitative phase analysis was performed using software assisted Rietveld refinement. The refinement was performed by least-square fitting of a theoretical powder diffraction pattern against the measured powder diffraction pattern. The fitting included a Chebychev polynomial fit and a Pearson VII profile fit function while having lattice parameters and crystallite sizes as open parameters. For each fitted powder diffraction pattern the presence of tetragonal zirconia, monoclinic zirconia and palladium oxide was verified. The quantification method resulted in phase content by weight which was used for the calculation of phase ratio by weight by dividing the phase content of tetragonal zirconia by the phase content of monoclinic zirconia. Alternatively, the tetragonal to monoclinic zirconia phase ratio could be determined as a ratio of signal intensities at 2θ=30.1° characteristic for tetragonal zirconia phase and at 2θ=28.1° characteristic for monoclinic zirconia phase.

Samples and Sample Preparation

Several samples of methane oxidation catalyst were prepared in support of the present invention.

Samples 1A-H (tm-ZrO$_2$)

A tetragonal zirconia powder (Saint-Gobain, ID# SZ61152, 3 mm diameter, lot #2005820395) was crushed and sieved to obtain a fraction with particle sizes in the range of 315-500 μm. The resulting powder was calcined in a flow of air using 5° C./min heating rate to temperatures of 750, 800, 850, 900, 1000, 1050, 1100, 1150° C. (denoted as samples 1A-H, respectively) and held at this temperature for 12 hours. The samples (1G and 1H) prepared by calcination at respectively 1100 and 1150° C. are comparative samples not according to the invention.

Samples 2A-H (Pd/tm-ZrO$_2$ Catalysts)

For the preparation of the Pd/tm-ZrO$_2$ catalysts, 2 g of each of zirconia samples 1A-H were impregnated with 0.775 mL of an aqueous HNO$_3$-containing Pd(NO$_3$)$_2$ solution (Pd concentration 1 mol/L) diluted with deionized (further referred to as DI) water prior to impregnation to match the pore volume of each individual calcined zirconia support (Examples 1A-H), then the impregnated samples were aged for 3 hours in a closed container at room temperature and dried for 16 hours at 80° C. in a drying oven. Subsequently, the so prepared catalyst samples were placed in an oven and calcined in a flow of air using 5° C./min heating rate to 600° C. and held at this temperature for 12 hours. The Pd content of the final Pd/ZrO$_2$ catalysts was determined to be 4 wt %, based on the whole catalyst sample. The samples (2G and 2H) prepared using samples 1G and 1H are comparative samples not according to the invention.

Sample 2D-HTA (Hydrothermally Aged Pd/tm-ZrO$_2$-(900° C.))

A Pd/tm-ZrO$_2$ catalyst (Sample 2D) was heated with 5° C./min to 600° C. in air. At 200° C. the sample was subjected to a gas stream containing 10 vol % H$_2$O in air. The heating rate was then maintained at 5° C./min until the desired 600° C. temperature was reached. The sample was then kept at 600° C. for 7 days (168 h) in a constant flow of 10 vol % H$_2$O in air. At the end of this period, the sample was cooled down to room temperature in a flow of air.

Sample 3 (Pd (CA)/tm-ZrO$_2$-(900° C.)—Citric Acid Assisted Impregnation)

A Pd/tm-ZrO2 catalyst was prepared using 2 g of zirconia sample from Example 1D, which was impregnated with an aqueous solution containing 0.775 mL of HNO$_3$-containing Pd(NO$_3$)$_2$ solution (Pd concentration 1 mol/L), 0.125 mL of DI water and 149 mg of citric acid (denoted as CA). The obtained wet impregnated catalyst was aged for 3 hours in a closed container at room temperature and then dried for 16 hours at 80° C. in a drying oven. Subsequently, the dried catalyst was placed in an oven and calcined in a flow of air using 5° C./min heating rate to 600° C. and held at this temperature for 12 hours. The Pd content of the final catalyst sample was determined to be 4 wt %, based on the whole catalyst sample.

Comparative Sample 4 (t-ZrO$_2$)

A tetragonal zirconia powder (Saint-Gobain, ID# SZ61152, 3 mm diameter, lot #2005820395) was crushed and sieved to obtain a fraction with particle sizes in the range of 315-500 μm. The resulting powder was then calcined in a flow of air using 5° C./min heating rate to 650° C. and held at this temperature for 12 hours.

Comparative Sample 4A (Pd/t-ZrO$_2$ Catalyst)

A methane oxidation catalyst was prepared using 3 g of the zirconia of Sample 4, which was impregnated with 1.164 mL of an aqueous HNO$_3$-containing Pd(NO$_3$)$_2$ solution (Pd concentration 1 mol/L) which was diluted with 0.636 mL of DI water prior to impregnation. The impregnated sample was aged for 3 hours in a closed container at room temperature and dried for 16 hours at 80° C. in a drying oven. Subsequently, the catalyst sample was placed in an oven and calcined in a flow of air using 5° C./min heating rate to 600° C. and held at this temperature for 12 hours. The Pd content of the final catalyst sample was determined to be 4 wt %, based on the whole catalyst sample.

Comparative Sample 4A-HTA (Hydrothermally Aged Pd/t-ZrO$_2$ Catalyst)

Comparative Sample 4A was heated with 5° C./min to 600° C. in air. At 200° C. the sample was subjected to a gas stream containing 10 vol % H$_2$O in air. The heating rate was then maintained at 5° C./min until the desired 600° C. temperature was reached. The catalyst sample was then kept at 600° C. for 7 days (168 h) in a constant flow of 10 vol % H$_2$O in air. At the end of this period, the sample was cooled down to room temperature in a flow of air.

Comparative Sample 5 (m-ZrO$_2$)

A monoclinic zirconia powder (Saint-Gobain, ID# SZ31164, 3.175 mm diameter, lot #SN2004910029) was crushed and sieved to obtain a fraction with particle sizes in the range of 315-500 μm. The resulting powder was calcined in a flow of air using 5° C./min heating rate to 650° C. and holding at this temperature for 12 hours.

Comparative Example 5A (Pd/m-ZrO$_2$ Catalyst)

An amount of 3 g of Comparative Sample 5 was impregnated with 1.162 mL of an aqueous HNO$_3$-containing Pd(NO$_3$)$_2$ solution (Pd concentration 1 mol/L) which was diluted with 1.238 mL of DI water prior to impregnation. The impregnated sample was then aged for 3 hours in a closed container at room temperature and dried for 16 hours at 80° C. in a drying oven. Subsequently, the catalyst sample was placed in an oven and calcined in a flow of air using 5° C./min heating rate to 600° C. and held at this temperature for 12 hours. The Pd content of the final catalyst sample was determined to be 4 wt %, based on the whole catalyst sample.

Comparative Example 5A-HTA (Hydrothermally Aged Pd/m-ZrO$_2$ Catalyst)

Comparative Example 5A was heated with 5° C./min to 600° C. in air. At 200° C. the sample was subjected to a gas stream containing 10 vol % H$_2$O in air. The heating rate was then maintained at 5° C./min until the desired 600° C. temperature was reached. The sample was then kept at 600° C. for 7 days (168 h) in a constant flow of 10 vol % H$_2$O in air. At the end of this period, the sample was cooled down to room temperature in a flow of air.

Comparative Sample 6 (Gamma-Al$_2$O$_3$)

An alumina extrudate sample (Saint-Gobain, ID#SA 6175, 1.59 mm diameter, lot #9608006) was crushed and sieved in order to obtain a fraction with particle sizes in the range of 315-500 µm. The resulting powder was then calcined in air at 650° C. for 12 h.

Comparative Sample 6A (Pd/Al$_2$O$_3$ Catalyst)

An amount of 50 g of the gamma-alumina of Sample 6 was impregnated with a solution of 18.78 mL aqueous HNO$_3$-containing Pd(NO$_3$)$_2$ (conc. 1 mol/L) which was diluted with 31.22 mL of DI water prior to impregnation. The impregnated wet catalyst sample was then aged for 3 hours in a closed container at room temperature and dried for 16 hours at 80° C. in a drying oven. Subsequently, the dried catalyst sample was calcined in a flow of air by heating it at 5° C./min to 600° C. and holding at this temperature for 12 hours. The Pd content of the so obtained prior art catalyst sample was found to be 4 wt %, based on the whole catalyst sample.

Comparative Sample 7 (PdPt/Gamma-Al$_2$O$_3$ Catalyst)

An alumina extrudate sample (Saint-Gobain, ID# SA 6175, 1.59 mm diameter, lot #9608006) was crushed and sieved in order to obtain a fraction with particle sizes on the range of 315-500 µm. The resulting powder was calcined in air at 650° C. for 12 h. For the impregnation with noble metal, 3 g of the alumina fraction was impregnated with a solution containing 0.97 mL aqueous HNO$_3$-containing Pd(NO$_3$)$_2$ (conc. 1 mol/L) and 0.22 mL aqueous HNO$_3$-containing Pt(NO$_3$)$_2$ (conc. 0.5 mol/L) which was diluted with 0.62 mL of DI water prior to impregnation. The obtained wet catalyst sample was aged for 3 hours in a closed container at room temperature and dried for 16 hours at 80° C. in a drying oven. Subsequently, the catalyst was calcined in a flow of air using 5° C./min heating rate to 600° C. and held at this temperature for 12 hours. The total (Pd and Pt) noble metal content of the final catalyst was found to be 4 wt %; 3.6 wt % Pd and 0.4 wt % Pt, based on the whole catalyst sample.

Comparative Sample 8 (Physically Mixed t-ZrO$_2$ and m-ZrO$_2$)

A tetragonal zirconia powder (Saint-Gobain, ID# SZ61152, 3 mm diameter, lot #2005820395) was crushed and sieved to obtain a fraction with particle sizes from 315-500 µm. The resulting powder was then calcined in a flow of air using 5° C./min heating rate to 650° C. and holding at this temperature for 12 hours to obtain zirconia that shows only XRD reflections belonging to t-ZrO$_2$ (Zirconia powder A). A monoclinic zirconia powder (Saint-Gobain, ID# SZ31164, 3.175 mm diameter, lot #SN2004910029) was crushed and sieved to obtain a fraction with particle sizes from 315-500 µm. The resulting powder was calcined in a flow of air using 5° C./min heating rate to 650° C. and holding at this temperature for 12 hours to obtain a zirconia which exhibited powder XRD reflections belonging to pure m-ZrO$_2$ (zirconia powder B). Both zirconia powders were mixed to prepare a physical mixture containing 95% wt. (t-ZrO$_2$, zirconia powder A) and 5% wt (m-ZrO$_2$, zirconia powder B) ratio, equivalent to a tetragonal to monoclinic weight ratio of 19:1.

Comparative Sample 8A (Pd/Physical Mixture t-ZrO$_2$/m-ZrO$_2$ Catalyst)

An amount of 1.5 g of the physically mixed t-/m-ZrO$_2$ powder of Comparative Sample 7 was impregnated with 0.582 mL of an aqueous HNO$_3$-containing Pd(NO$_3$)$_2$ solution (Pd concentration 1 mol/L). Prior to impregnation, the above Pd(NO$_3$)$_2$ solution was diluted with 0.093 mL of DI water. The wet catalyst sample was then aged for 3 hours in a closed container at room temperature and then dried for 16 hours at 80° C. in a drying oven. Subsequently, the dried catalyst sample was placed in an oven and calcined in a flow of air using 5° C./min heating rate to 600° C. and holding at this temperature for 12 hours. The Pd content of the final catalyst was determined to be 4 wt %, based on the whole catalyst sample invention.

Comparative Sample 9 (t-ZrO$_2$—S)

A tetragonal, sulfur-modified zirconia powder (Saint-Gobain, ID# SZ61192, 3 mm diameter, lot # NO 2013820069) was crushed and sieved to obtain a fraction with particle sizes in the range of 315-500 µm. The resulting powder was calcined in a flow of air using 5° C./min heating rate to 650° C. and holding at this temperature for 12 hours.

Comparative Sample 9A (Pd/t-ZrO$_2$—S Catalyst)

An amount of 3 g of Comparative Sample 9 was impregnated with 1.163 mL of an aqueous HNO$_3$ containing Pd(NO$_3$)$_2$ solution (Pd concentration 1 mol/L) which was diluted with 0.036 mL of DI water prior to impregnation. The impregnated t-ZrO$_2$—S sample was then aged for 3 hours in a closed container at room temperature and dried for 16 hours at 80° C. in a drying oven. Subsequently, the catalyst sample was placed in an oven and calcined in a flow of air using 5° C./min heating rate to 600° C. and held at this temperature for 12 hours. The Pd content of the final PD/t-ZrO$_2$—S catalyst sample was determined to be 4 wt %, based on the whole catalyst sample.

Comparative Sample 10 (t-ZrO$_2$—W)

A tetragonal, tungsten-modified zirconia powder (Saint-Gobain, ID# SZ61143, 3 mm diameter, lot # NO2014820006) was crushed and sieved to obtain a fraction with particle sizes in the range of 315-500 µm. The resulting powder was calcined in a flow of air using 5° C./min heating rate to 650° C. and holding at this temperature for 12 hours.

Comparative Sample 10A (NY t-ZrO$_2$—W Catalyst)

An amount of 3 g of Comparative Sample 10 was impregnated with 0.580 mL of an aqueous HNO$_3$ containing Pd(NO$_3$)$_2$ solution (Pd concentration 1 mol/L) which was diluted with 0.560 mL of DI water prior to impregnation. The impregnated sample was then aged for 3 hours in a closed container at room temperature and dried for 16 hours at 80° C. in a drying oven. Subsequently, the sample was impregnated for a second time with 0.580 mL of an aqueous HNO$_3$ containing Pd(NO$_3$)$_2$ solution (Pd concentration 1 mol/L) which was diluted with 0.560 mL of DI water prior to impregnation. The impregnated sample was then aged for 3 hours in a closed container at room temperature and dried for 16 hours at 80° C. in a drying oven. Finally, the catalyst sample was placed in an oven and calcined in a flow of air using 5° C./min heating rate to 600° C. and held at this temperature for 12 hours. The Pd content of the final Pd/t-ZrO$_2$—W catalyst sample was determined to be 4 wt %, based on the whole catalyst sample.

Results

FIG. 1 shows the powder XRD patterns obtained for the catalyst Samples 2A to H and Comparative Samples 4A. Herein, the peak at 2θ=30.1° is characteristic for tetragonal zirconia phase (denoted in FIG. 1 with t-ZrO$_2$) and the peak at 2θ=28.1° characteristic for monoclinic zirconia phase (denoted in FIG. 1 with m-ZrO$_2$). The analysis of the FIG. 1 reveals that, all zirconia samples exhibit different tetragonal or tetragonal and monoclinic zirconia XRD reflections and in the case of those containing both types of reflections different tetragonal to monoclinic reflections intensity ratios, i.e. different tetragonal to monoclinic phase ratios, see Table 2. It should be noted however that, a calcination temperature of 650° C. (Comparative Sample 4A) afforded essentially no change in the original zirconia precursor phase composition, i.e. predominantly t-ZrO$_2$. Comparative Sample 4A (650° C.) shows a weight ratio of tetragonal to monoclinic zirconia phases above 31:1, i.e. outside of the range of weight ratio according to the invention. Although, at these temperatures the formation of m-ZrO$_2$ has commenced the amount of m-ZrO$_2$ formed was still insignificant and the obtain weight ratio of tetragonal to monoclinic zirconia obtained remained outside of the range of weight ratio according to the invention. Comparative Samples 2G and 2H show a ratio of tetragonal to monoclinic zirconia phases below 1:1, i.e. outside of the range of weight ratios according to the invention. These comparative samples were obtained upon calcination at very high temperatures of 1100° C. and above. The powder XRD pattern of a commercial m-ZrO$_2$ sample (Comparative Sample 5, shown in FIG. 3) shows reflections corresponding to pure m-ZrO$_2$ phase. In contrast, the zirconia samples which were calcined in the temperature range from 750 to 1050° C. (Examples 2A-F) exhibit tetragonal and monoclinic zirconia powder XRD reflections, i.e. tm-ZrO$_2$ composition with different weight ratios of tetragonal to monoclinic zirconia that fall within the range of tetragonal to monoclinic weight ratios specified for the present invention.

TABLE 2

| Sample | t/m weight ratio |
|---|---|
| 2A | 30.2:1 |
| 2B | 28.5:1 |
| 2C | 22.9:1 |
| 2D | 21.2:1 |
| 2E | 15.3:1 |
| 2F | 2.3:1 |
| 2G | 0.4:1 |
| 2H | 0.1:1 |

TABLE 2-continued

| Sample | t/m weight ratio |
|---|---|
| 4A | 37.2:1 |
| 5A | 100% m-ZrO$_2$ |

Figure 2:
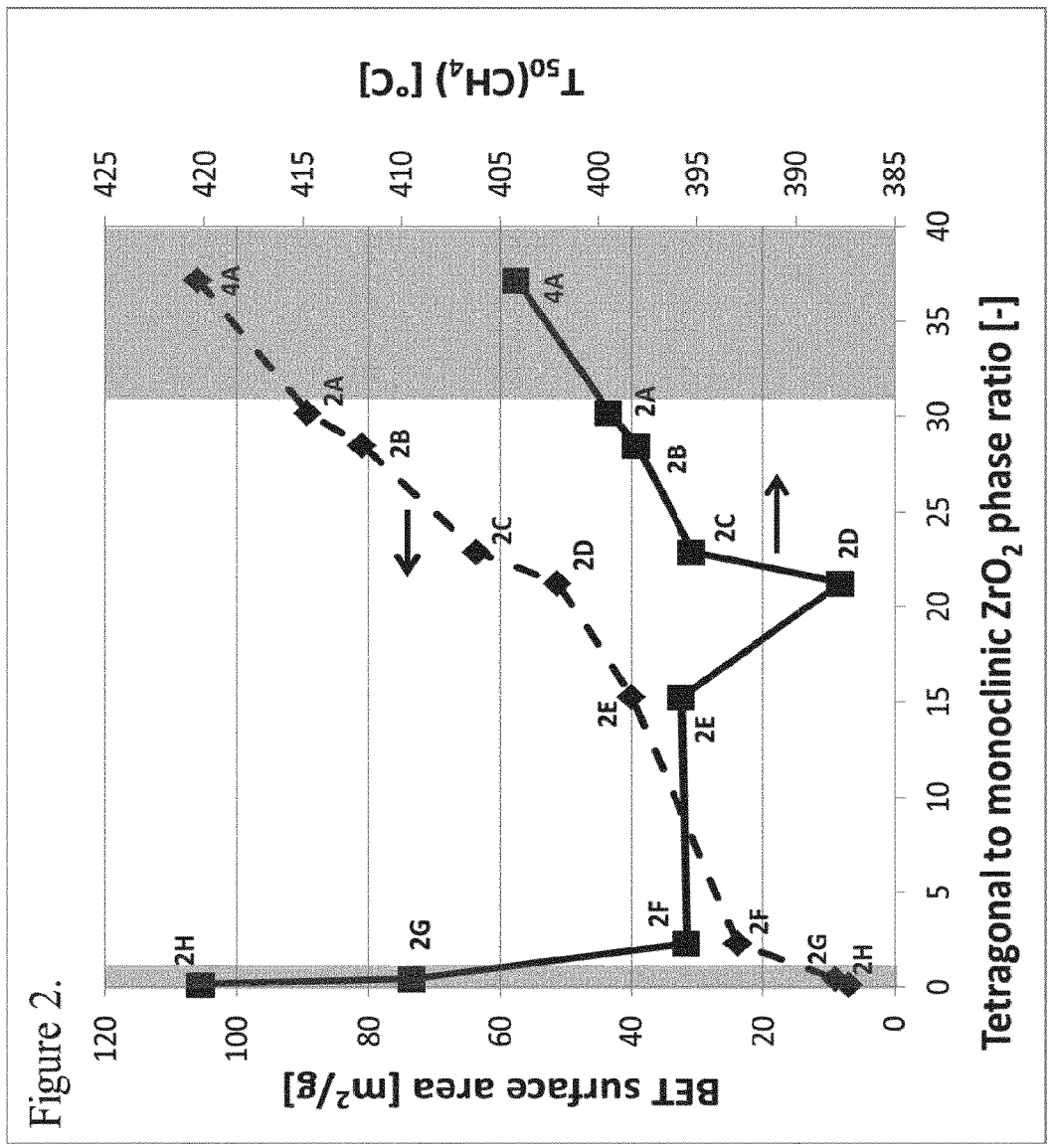
FIG. 2 shows the $CH_4$ oxidation activity ($T_{50}(CH_4)$ values) as a function of the specific surface area ($S_{BET}$) and the tetragonal to monoclinic zirconia weight percent ratios determined by a quantitative XRD phase analysis of the catalyst Samples 2A-H and Comparative Sample 4A.

FIG. 2 shows the CH$_4$ oxidation activity (T$_{50}$(CH$_4$) values) as a function of the specific surface area (S$_{BET}$) and the tetragonal to monoclinic weight ratios of the tm-ZrO$_2$ of Samples 2A to 2H and Comparative Example 4A. The T$_{50}$(CH$_4$) data shown are the T$_{50}$ (CH$_4$) values measured during the fourth ascending temperature profile under the test conditions described in Table 1. The tetragonal to monoclinic zirconia weight ratio for each of the Samples was determined by quantitative XRD phase analysis of Samples 2A to 2H and Comparative Example 4A. The analysis of the data presented in FIG. 2 reveals that the surface area is not the decisive parameter for obtaining a high methane oxidation activity, i.e. a low T$_{50}$(CH$_4$) value. Rather, FIG. 2 shows that the weight ratio of tetragonal to monoclinic zirconia phases in the catalyst pays a significant role on the methane oxidation activity (T$_{50}$(CH$_4$) values). More specifically, it appears that within a specific range of the tetragonal to monoclinic zirconia weight ratio of the zirconia in the catalyst there is an optimum in the methane oxidation activity (i.e. low T$_{50}$(CH$_4$) values). Specifically, the catalysts prepared from a zirconia containing dispersion of monoclinic zirconia in tetragonal zirconia with tetragonal to monoclinic zirconia weight ratio of from 1:1 to 31:1 (Examples 2A to 2F), possessing surface areas <90 m$^2$/g, were found to exhibit significantly superior methane oxidation activity/performance, i.e. lower T$_{50}$(CH$_4$) values relative to the comparative Samples 2G, 2H (weight ratio below 1:1) and 4A (weight ratio above 31:1. Of the tm-ZrO$_2$ based catalyst samples, the methane oxidation catalyst based on zirconia with tetragonal to monoclinic weight ratio of approximately 21:1 (Sample 2D) exhibited the best methane oxidation activity (or lowest T$_{50}$(CH$_4$) value).

The methane oxidation activity, i.e. T$_{50}$(CH$_4$) values were measured for several catalyst samples containing 4 wt % Pd. Table 3 shows the T$_{50}$(CH$_4$) values of the zirconia based catalyst Samples 2A to 2F, and comparative Samples 2G, 2H, 4A and 5A. Table 3 further shows the T$_{50}$(CH$_4$) values for two alumina based comparative catalyst samples, i.e. comparative Sample 6A and comparative Sample 7. Comparative Sample 7 contains Pt in addition to Pd. The analysis of the data in the table shows that, the Pd/tm-ZrO$_2$ catalysts of this invention (Samples 2A, 2B, 2C, 2D, 2E and 2F) exhibit superior methane oxidation activity (lower T$_{50}$(CH$_4$) values) relative to the prior art t-ZrO$_2$ and m-ZrO$_2$ supports based catalysts with the same Pd loading (Comparative Samples 4A and 5A). Moreover, the analysis of the data shows that the Pd/tm-ZrO$_2$ catalysts of this invention (and in particular Sample 2D) exhibits significantly superior methane oxidation activity (lower T$_{50}$(CH$_4$) values) relative to the alumina-based Pd/Al$_2$O$_3$ (Sample 6A) and Pd—Pt/Al$_2$O$_3$ catalysts (Sample 7) of the prior art at the same level of noble metal loading (4 wt %). This clearly shows that the Pd/tm-ZrO$_2$ catalysts of the present invention are more active catalysts for methane oxidation relative to the comparative catalysts of the prior art. In addition, the data in Table 3 shows that modified-zirconia, including sulfated and tungsten-modified zirconia (Samples 9 and 10), result in a lower catalyst activity in methane oxidation.

TABLE 3

| sample | $T_{50}(CH_4)$ [° C.] | $T_{50}(CH_4)$ [° C.] Hydrothermally aged |
|---|---|---|
| 2A | 399 | |
| 2B | 398 | |
| 2C | 395 | |
| 2D | 387 | 394 |
| 2E | 395 | |
| 2F | 396 | |
| 3 | 383 | |
| 2G* | 409 | |
| 2H* | 420 | |
| 4A* | 404 | 410 |
| 5A* | 413 | 426 |
| 6A* | 479 | |
| 7* | 454 | |
| 8A* | 404 | |
| 9A* | 479 | |
| 10A* | 560 | |

*Comparative Samples

During normal use of the catalysts, e.g. in exhaust gas treatment, the catalyst will be exposed to hydrothermal conditions that may affect the activity of the catalyst over time. Water generated by the oxidation of, in particular, methane in a natural gas fueled engine represents a significant part (usually 8-17% vol) of the exhaust gas composition. In order to test the methane oxidation activity stability of the catalysts under hydrothermal conditions, fresh catalyst samples of catalyst sample 2D and comparative catalyst Samples 4A, 5A and 6A were exposed to an extended hydrothermal aging treatment, as described herein above for the resulting hydrothermally aged Samples 2D-HTA, 4A-HTA, and 5A-HTA. Following this prolonged hydrothermal aging treatment the catalysts were subjected to testing for methane oxidation activity. The data obtained in these tests are also listed in Table 3.

Again, all samples were synthesized intentionally with the same 4 wt % of noble metal (Pd) loading. As can be seen from the data in Table 3, following the hydrothermal aging, the Pd/tm-$ZrO_2$ catalyst of this invention (Sample 2D-HTA) exhibited the highest methane oxidation activity (lowest $T_{50}$ ($CH_4$) value) among the hydrothermally aged samples and it retained its activity advantage over the comparative Pd/t-$ZrO_2$ (Sample 4A-HTA) and Pd/m-$ZrO_2$ (Sample 5A-HTA) hydrothermally aged catalyst samples of the prior art. This makes the methane oxidation catalysts of the present invention particularly suitable for methane oxidation/removal from exhaust gases containing significant levels of $H_2O$ generated from natural gas fueled engines, relative to the catalysts of the prior art.

Figure 3:
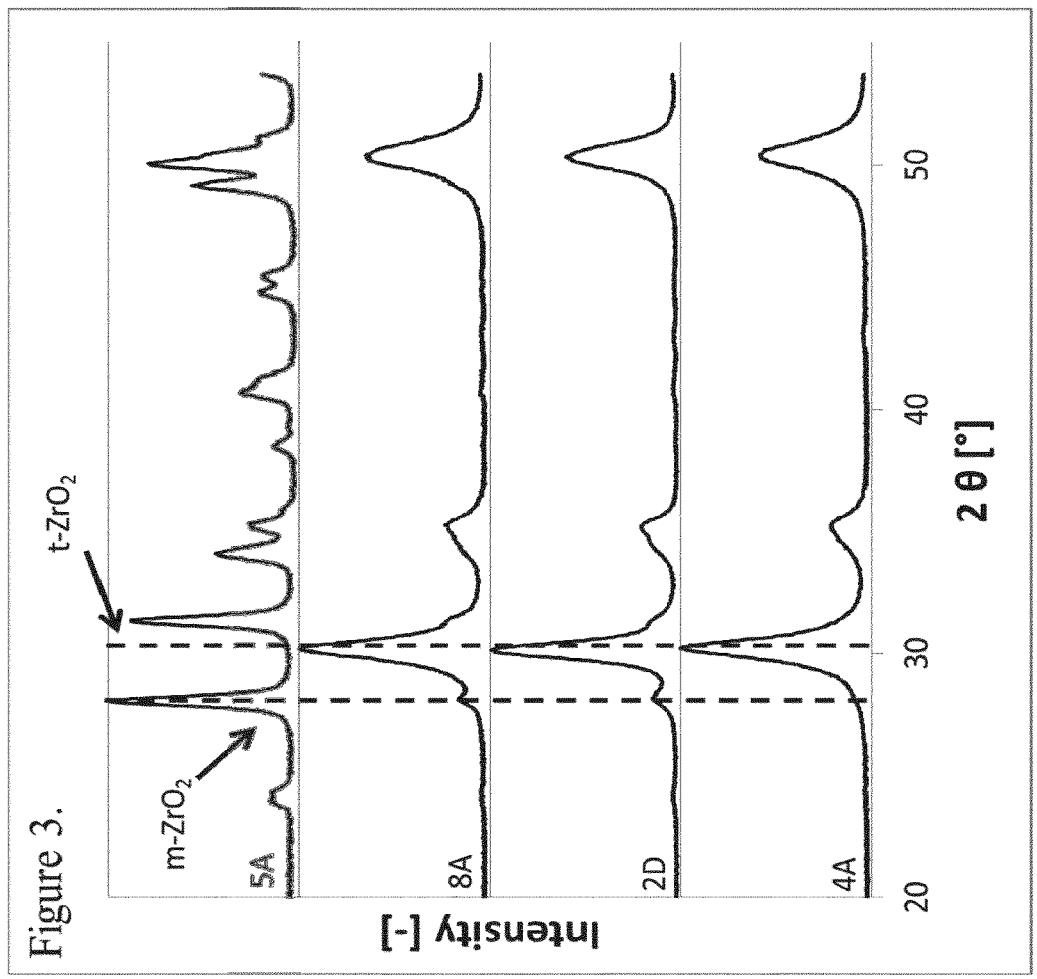
FIG. 3 shows the powder XRD patterns obtained for methane oxidation catalysts prepared as described in Sample 2D and Comparative Samples 4A, 5A and 8A.

FIG. 3 shows the powder XRD patterns obtained for Sample 2D, Comparative Sample 4A, Comparative Sample 5A and Comparative Sample 8A. Herein, the peak at 2θ=30.1° is characteristic for tetragonal zirconia phase and the peak at 2θ=28.1° characteristic for monoclinic zirconia phase. Comparative Sample 8 is an intentionally prepared physical mixture of t-$ZrO_2$ and m-$ZrO_2$. Comparative Sample 8A was prepared in order to test whether the performance of the tm-$ZrO_2$ based catalyst according to the present invention could be achieved by simply physically mixing t-$ZrO_2$ and m-$ZrO_2$ phases at the same beneficial tetragonal to monoclinic zirconia weight ratio. Basis the quantitative analysis of the XRD pattern of our tm-$ZrO_2$ (Sample 2D) we have determined that the sample contains about 95.5 wt % t-$ZrO_2$ and 4.5 wt % of m-$ZrO_2$ and thus a tetragonal to monoclinic weight ratio of 21.2:1. Therefore, the preparation of the physical mixture was carried out by mixing the above amounts of pure t-$ZrO_2$ and m-$ZrO_2$ powders to obtain a physical mixture of a 95/5 wt % composition (Comparative Sample 8), possessing similar tetragonal to monoclinic weight ratio similar to Sample 2D. As can be seen in FIG. 3, the analysis of the powder XRD patterns for these two samples (Sample 2D and comparative Sample 8A) reveals that both samples exhibit very similar XRD pattern reflections, i.e. similar t-$ZrO_2$ and m-$ZrO_2$ quantities containing composition.

Table 3 further shows the methane oxidation activity, i.e. the $T_{50}(CH_4)$ values exhibited by the Sample 2D of this invention and Comparative Sample 8A both containing the same 4% wt Pd level. The data show that even though both catalysts exhibited very similar weight ratio of t-$ZrO_2$ and m-$ZrO_2$, the catalyst of this invention (Sample 2D) exhibited a significantly higher methane oxidation activity, i.e. lower $T_{50}(CH_4)$ value, relative to Comparative Sample 8A. This shows that physically mixing tetragonal and monoclinic zirconia results in a final methane oxidation catalyst with inferior methane oxidation activity compared to a catalyst, comprising similar amounts of noble metal and tetragonal and monoclinic zirconia weight ratio, wherein the tetragonal and monoclinic zirconia were obtained by thermal conversion of a single zirconia precursor.

Table 3 also shows the methane oxidation activity, i.e. the $T_{50}(CH_4)$ values exhibited by the Sample 3 of this invention, which was prepared by method similar to Sample 2D, with the difference that the noble metal precursor impregnation solution also contained citric acid as complexing agent. The data show that Sample 3 exhibits a superior catalytic performance in methane oxidation in comparison to Sample 2D. Thus, using a noble metal complexing agent during the impregnation step in the synthesis of the methane oxidation catalyst of the present invention has a beneficial effect on the catalyst performance of the finished methane oxidation catalyst.

Figure 4:
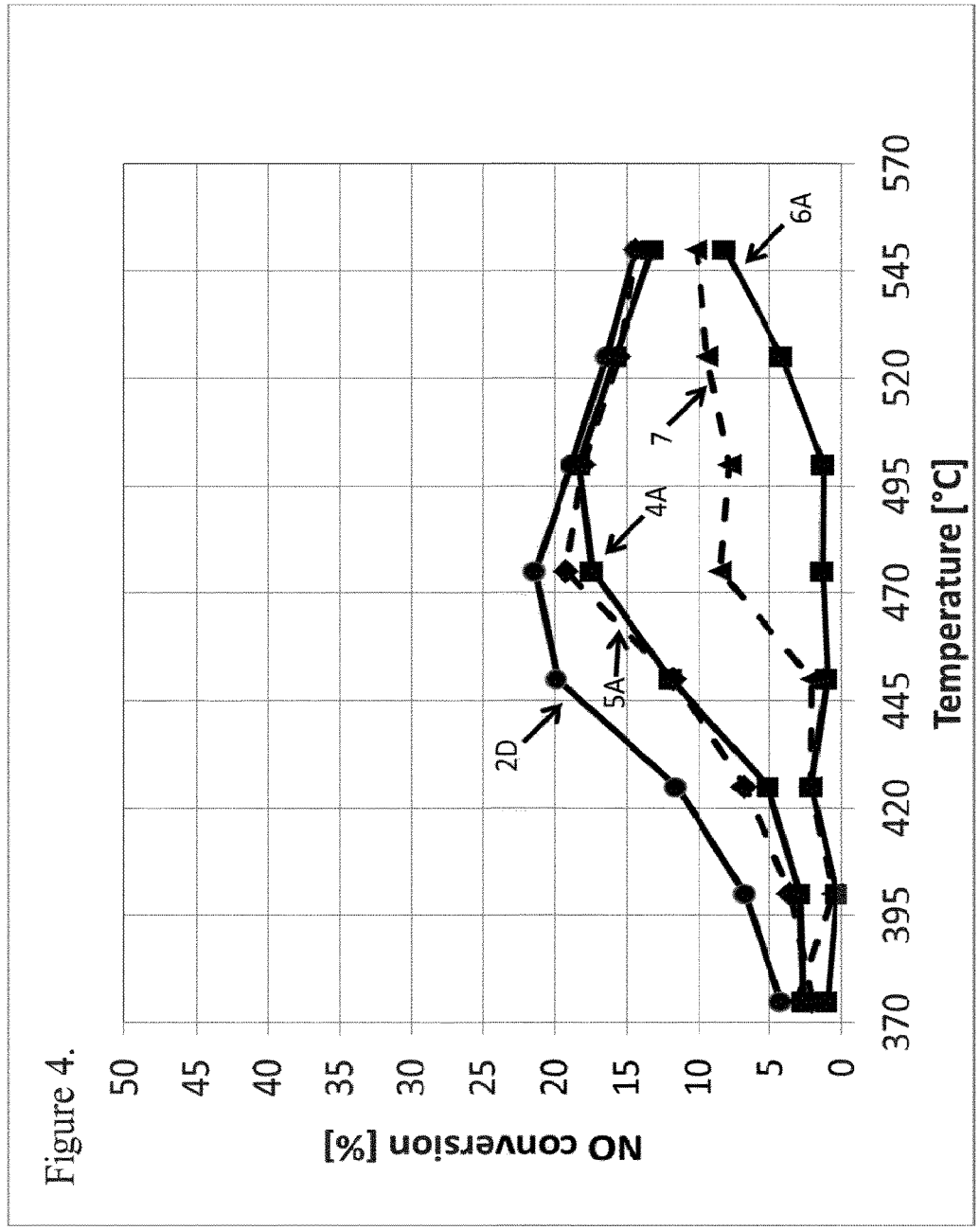
FIG. 4 shows the NO conversion vs. reaction temperature for the following catalysts: 4 wt % Pd on tm-$ZrO_2$ (Sample 2D), 4 wt % Pd/t-$ZrO_2$ (Comparative Sample 4A), 4 wt % Pd on m-$ZrO_2$ (Comparative Sample 5A), 4 wt % Pd on gamma-$Al_2O_3$ (Comparative Sample 6A) and 3.6 wt % Pd and 0.4 wt % Pt on gamma-$Al_2O_3$ (Comparative Sample 7).

FIG. 4 shows the NO conversion vs. reaction temperature (NO Oxidation Activity) data for Sample 2D, comparative Sample 4A, comparative Sample 5A, comparative Sample 6A and comparative Sample 7. The analysis of the NO Conversion data clearly shows that the Pd/tm-$ZrO_2$ catalyst of this invention (Example 2D) exhibits better NO conversion activity compared to the comparative prior art, in particular in the temperature range of 395° C. to 470° C. This suggests that the Pd/tm-$ZrO_2$ catalysts of this invention may next to methane also convert at least part of any NO present in a gas stream comprising methane, which is particularly useful where the gas stream comprising methane is an exhaust gas from natural gas fueled engines in transport and stationary applications.

Figure 5:
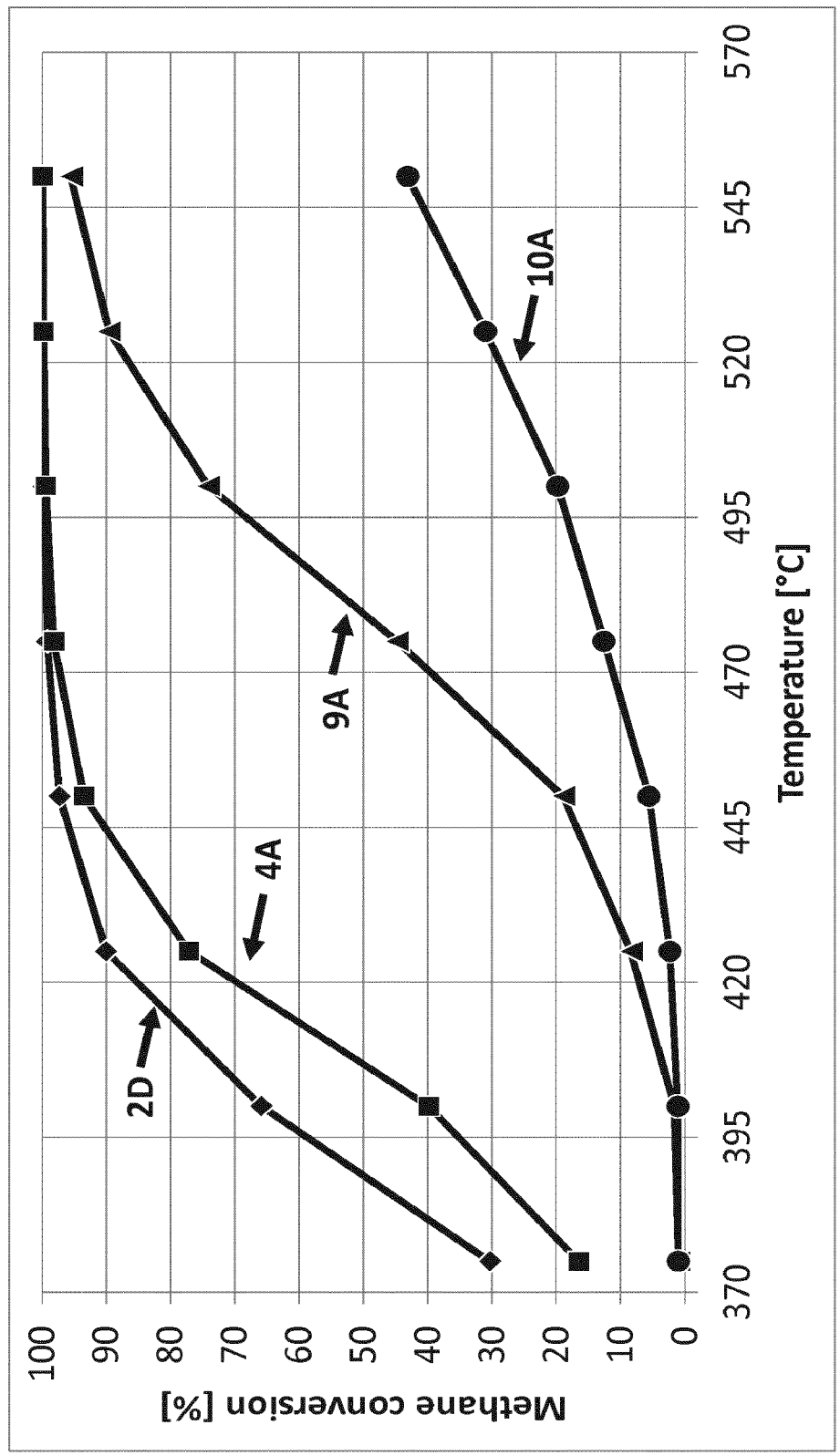
FIG. 5 shows the methane conversion vs. reaction temperature for the following catalysts: 4 wt % Pd on tm-$ZrO_2$ (Sample 2D), 4 wt % Pd/t-$ZrO_2$ (Comparative Sample 4A), 4 wt % Pd on t-$ZrO_2$—S(Comparative Sample 9A), and 4 wt % Pd on t-$ZrO_2$—W (Comparative Sample 10A).

FIG. 5 shows the methane conversion vs. reaction temperature (methane oxidation conversion activity) exhibited by the Sample 2D of this invention and Comparative Samples 9A, Comparative Sample 10A and Comparative Sample 4A. Sample 2D (Pd/tm-$ZrO_2$) exhibits a lower $T_{50}$ ($CH_4$) value in comparison to Comparative Samples 9A (Pd/t-$ZrO_2$—S) and Comparative Samples 10A (Pd/t-$ZrO_2$—W) which demonstrates that the Pd/tm-$ZrO_2$ of the present invention shows superior activity towards methane oxidation as S- or W-modified $ZrO_2$ of the prior art.

What is claimed is:

1. A method of treating an exhaust gas comprising methane and NO by contacting said exhaust gas with a catalyst in the presence of oxygen and oxidizing at least part of the methane in the gas stream to carbon dioxide and water and at least part of the NO into $NO_2$ obtaining a treated gas stream;

wherein the catalyst comprises one or more noble metals supported on non-modified zirconia, wherein the zirconia comprises tetragonal zirconia and monoclinic zirconia, and wherein the weight ratio of tetragonal zirconia to monoclinic zirconia is in the range of from 1:1 to 31:1.

2. A method according to claim 1 wherein the treated gas stream obtained in claim 1 is contacted with an SCR (selective catalytic reduction) catalyst to reduce NO and/or $NO_2$ to $N_2$.

3. A method according to claim 2, wherein the stream comprising methane is an exhaust gas from a natural gas-fueled engine.

4. A method according to claim 2 wherein the SCR catalyst comprising titanium(IV)oxide ($TiO_2$), tungsten(VI) oxide ($WO_3$), vanadium(V)oxide ($V_2O_5$), molybdenum(VI) oxide, noble metals, transition metal-exchanged zeolite or a zeolite.

5. A method according to claim 2 wherein the exhaust gas comprises less than 5000 ppmv of methane, based on the volume of the total gas stream.

6. A method according to claim 2 wherein the $T_{50}$ ($CH_4$) of the methane oxidation catalyst may be equal to or less than 405° C.

* * * * *